US012767842B2

(12) United States Patent
Seeley et al.

(10) Patent No.: US 12,767,842 B2
(45) Date of Patent: Oct. 20, 2026

(54) TRANSPARENT CERAMICS FABRICATED BY MATERIAL JET PRINTING

(71) Applicant: Lawrence Livermore National Security, LLC, Livermore, CA (US)

(72) Inventors: Zachary Seeley, Livermore, CA (US); Nerine Cherepy, Piedmont, CA (US); Alexander Drobshoff, Livermore, CA (US); Stephen Anthony Payne, Castro Valley, CA (US); Ian Robert Phillips, Sunnyvale, CA (US); Thomas John Rudzik, Livermore, CA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 708 days.

(21) Appl. No.: 17/964,735

(22) Filed: Oct. 12, 2022

(65) Prior Publication Data

US 2023/0110835 A1 Apr. 13, 2023

Related U.S. Application Data

(60) Provisional application No. 63/254,865, filed on Oct. 12, 2021.

(51) Int. Cl.

*C09D 11/36* (2014.01)
*B28B 1/00* (2006.01)

(Continued)

(52) U.S. Cl.

CPC .............. *C09D 11/36* (2013.01); *B28B 1/001* (2013.01); *B41M 5/0047* (2013.01); *C09D 11/38* (2013.01)

(58) Field of Classification Search

CPC ......... B33Y 10/00; B33Y 40/20; B33Y 70/00; B33Y 70/10; B22F 10/14; B29C 64/165;

(Continued)

(56) References Cited

U.S. PATENT DOCUMENTS 9,415,590 B2 * 8/2016 Barton ....................... B41J 2/06
10,840,668 B2 11/2020 Payne et al.

(Continued)

OTHER PUBLICATIONS

Yao et al., "Diode-pumped tape casting planar waveguide YAG/Tm:YAG/YAG ceramic laser at 2013.76 nm," Optics Letters, vol. 41, No. 2, Jan. 15, 2016, pp. 254-258.

(Continued)

*Primary Examiner* — John P Zimmermann
(74) *Attorney, Agent, or Firm* — Zilka-Kotab, P.C.

(57) ABSTRACT

A method for forming a transparent ceramic, in accordance with one embodiment, includes forming a green body by material jetting an ink, and processing the green body to form the ceramic to transparency. A product, in accordance with one embodiment, includes an ink for forming a transparent ceramic. The ink is physically characterized as having a density, surface tension, and viscosity configured to enable material jetting of the ink in contained, sequential droplets having a volume in the range of about 1 picoliter to about 1 nanoliter when jetted from a nozzle having an inner diameter in the range of about 10 microns to about 300 microns. A product, in accordance with another embodiment, includes a transparent ceramic, at least a portion of the transparent ceramic having layers of less than 50 microns per layer with physical characteristics of formation by material jetting.

20 Claims, 6 Drawing Sheets

(51) Int. Cl.
*B41M 5/00* (2006.01)
*C09D 11/38* (2014.01)

(58) Field of Classification Search
CPC ... A61C 13/0019; B28B 1/001; H01S 3/0612; B32B 3/00
See application file for complete search history.

(56) References Cited

U.S. PATENT DOCUMENTS

| | | | | |
|---|---|---|---|---|
| 2008/0151358 | A1* | 6/2008 | Jiang | H01S 3/16 359/323 |
| 2010/0096596 | A1* | 4/2010 | Lewis | H01B 1/22 252/500 |
| 2013/0044779 | A1* | 2/2013 | Byren | C30B 13/20 117/37 |
| 2017/0326816 | A1* | 11/2017 | Seepersad | B29C 64/291 |
| 2019/0134895 | A1* | 5/2019 | Abbott, Jr. | B33Y 10/00 |
| 2020/0047252 | A1* | 2/2020 | Kritchman | B29C 64/209 |
| 2020/0140344 | A1* | 5/2020 | Xiao | C04B 41/52 |
| 2020/0261191 | A1* | 8/2020 | Zenou | A61C 13/0018 |
| 2020/0281758 | A1* | 9/2020 | Tan | A61F 5/445 |
| 2020/0361146 | A1* | 11/2020 | Zhou | B29C 64/209 |
| 2021/0008246 | A1* | 1/2021 | Ameer | A61L 27/10 |
| 2021/0167231 | A1* | 6/2021 | Cardwell | H10F 77/146 |

OTHER PUBLICATIONS

Ge et al., "Fabrication of composite YAG/Nd:YAG/YAG transparent ceramics for planar waveguide laser," Optical Materials Express, vol. 4, No. 5, May 1, 2014, 8 pages.
Ma et al., "Longitudinally diode-pumped planar waveguide YAG/Yb:LuAG/YAG ceramic laser at 1030.7 nm," Optics Letters, vol. 41, No. 14, Jul. 15, 2016, pp. 3317-3319.
Tang et al., "Diode-pumped multilayer Yb:YAG composite ceramic laser," Laser Physics Letters, vol. 9, No. 8, 2012, pp. 564-569.
Grace Period Disclosure, "Additive Manufacturing of Transparent Ceramic Laser Gain Media—Rods, Thin Disks, and Planar Waveguides," Z.M. Seeley, T.J. Rudzik, I.R. Phillips, T.D. Yee, N.J. Cherepy, A.D. Drobshoff, O.D. Herrera, F.J. Ryerson, S. A. Payne, Oct. 13, 2021, 2 pages.
Grace Period Disclosure, "Material jet printing of transparent ceramic Yb:YAG planar waveguides," Zachary M. Seeley, Ian R. Phillips, Thomas J. Rudzik, Nerine J. Cherepy, Alexander D. Drobshoff, Stephen A. Payne, May 7, 2021, 4 pages.
Seeley et al., "Expanded Phase Stability of Gd-Based Garnet Transparent Ceramic Scintillators," Journal of Materials Science, vol. 29, No. 19, Oct. 14, 2014, 11 pages.
Derby, B., "Additive Manufacture of Ceramics Components by Inkjet Printing," Engineering, vol. 1, No. 1, Mar. 2015, pp. 113-123.
Kauppila, L., "What Is Material Jetting?—3D Printing Basics," ALL3DP, Apr. 26, 2022, 30 pages, retrieved from https://all3dp.com/1/what-is-material-jetting-3d-printing-basics/.
Derby, B., "Inkjet Printing of Functional and Structural Materials: Fluid Property Requirements, Feature Stability, and Resolution," Annual Review of Materials Research, Jun. 2010, pp. 395-414.
Martin et al., "Inkjet printing—the physics of manipulating liquid jets and drops," Journal of Physics Conference Series, vol. 105, Apr. 2008, 16 pages.
Amooey et al., "Study of Surface Tension of Binary Mixtures of Poly (Ethylene Glycol) in Water and Poly (Propylene Glycol) in Ethanol and its Modeling Using Neural Network," Iranian Journal of Chemical Engineering, vol. 11, No. 1, 2014, pp. 19-29.
Yang et al., "Novel transparent ceramics for solid-state lasers," High Power Laser Science and Engineering, Dec. 20, 2013, pp. 138-147.
Lewis, J., "Direct Ink Writing of 3D Functional Materials," Advanced Functional Materials, vol. 16, 2006, pp. 2193-2204.
Ikesue et al., "Fabrication and Optical Properties of High-Performance Polycrystalline Nd-YAG Ceramics for Solid-State Lasers", Journal of the American Ceramic Society, vol. 78, 1995, pp. 1033-1040.
Jones et al., "Direct Ink Write Fabrication of Transparent Ceramic Gain Media," Optical Materials, vol. 75, 2018, 14 pages, retrieved from https://www.osti.gov/pages/biblio/1438790.
Seeley et al., "3D Printed Transparent Ceramic YAG Laser Rods: Matching the Core-Clad Refractive Index," Optical Materials, vol. 107, Sep. 2020, 13 pages, retrieved from https://www.osti.gov/pages/biblio/1662046.
Baer et al., "Frontiers in passively mode-locked high-power thin disk laser oscillators," Optics Express, vol. 20, No. 7, Mar. 26, 2012, 12 pages.
Seeley et al., "3D Printed Ceramic Laser Gain Media," SPIE Defence and Commercial Sensing Digital Forum, presentation, Apr. 2021, 18 pages.
Abbot, S., "Ohnesorge for Inkjet," Professor Steven Abbott, 2022, 7 pages, retrieved from https://www.stevenabbott.co.uk/practical-coatings/ohnesorge.php.
Stringer et al., "Formation and Stability of Lines Produced by Inkjet Printing," Langmuir, vol. 26, No. 12, 2010, pp. 10365-10372.
Li et al., "The history, development, and future prospects for laser ceramics: A review," International Journal of Refractory Metals and Hard Materials, vol. 39, 2013, pp. 44-52.
Calignano et al., "Overview on Additive Manufacturing Technologies," Proceedings of the IEEE, vol. 105, No. 4, Apr. 2017, pp. 593-612.
Hasegawa et al., "Lasing characteristics of refractive-index-matched composite Y3Al5O12 rods employing transparent ceramics for solar-pumped lasers," Japanese Journal of Applied Physics, vol. 57, 2018, 6 pages.

* cited by examiner

TRANSPARENT CERAMICS FABRICATED BY MATERIAL JET PRINTING

RELATED APPLICATION

This application claims priority to U.S. Provisional Patent Appl. No. 63/254,865 filed Oct. 12, 2021, which is herein incorporated by reference.

This invention was made with Government support under Contract No. DE-AC52-07NA27344 awarded by the United States Department of Energy. The Government has certain rights in the invention.

FIELD OF THE INVENTION

The present invention relates to material jet printing, and more particularly, this invention relates to transparent ceramics fabricated thereby.

BACKGROUND

Many advanced optics are assembled from multiple components. For example, planar waveguides for high power lasers and pixelated scintillator detectors require multiple components. Such components would benefit from the ability to remove sharp interfaces, include more complex geometries, enable gradient compositions and/or smaller feature sizes, reduce cost, etc. Additive manufacturing of optics, via material jetting, according to various aspects described herein provides the foregoing beneficial characteristics.

Certain transparent ceramic materials have been demonstrated as suitable for use as laser gain media. Generally, nanoparticles are synthesized from ceramic precursor materials (e.g., metal salts and organometallics) via chemical, precipitation or combustion processes, and then mixed with organic solvents, water, surfactants, oligomers, or mixtures thereof to create an ink. The ink is formed into a "green body" which generally has the shape and dimensions, preferred aspect ratio, etc. of the resulting optic but includes surface modifying compounds/groups as well as liquid and/or organic components, as well as porosity. The green body may be cast from a die or other suitable mold, or produced as a free-standing monolith. Next, the surface modifying compounds/groups, liquid and organic components are removed. The resulting structure is densified to remove residual porosity and to form the final optic.

For optics to be used as laser gain media, the final optic typically includes a suitable optically-active dopant that acts as a lasing center, and generates the output laser beam. The dopant may be dispersed throughout the optic, or may be present in select regions, e.g., using a layered synthesis technique whereby multiple layers of green body material each having different compositions are formed into a single monolith.

While the foregoing conventional techniques and compositions result in useful optics, in some cases suitable for use as laser gain media, such optics suffer from undesirable structural and operational characteristics. For instance, precise control over the compositional and structural features of the optics produced using the above techniques may give rise to undesirable operational characteristics such as unstable optical mode, thermal lensing, optical distortion, reduced efficiency, and parasitic oscillations. Moreover, the achievable dimensions using state of the art fabrication techniques are fairly large (>100 μm to millimeter size), are difficult and expensive to fabricate, and generally are limited to planar structures.

Accordingly, it would be beneficial to provide systems, methods, and materials suitable for generating optics that overcome the foregoing limitations imposed by conventional fabrication techniques so as to improve the function of the resulting optics, e.g., as laser gain media, by stabilizing the optical mode, compensating for thermal lensing, minimizing optical distortion, maximizing the efficiency, and reducing parasitic oscillations. Moreover, it would be beneficial to provide systems, methods, and materials suitable for generating optics having smaller dimensions than was heretofore possible.

SUMMARY

A method for forming a transparent ceramic, in accordance with one embodiment, includes forming a green body by material jetting an ink, and processing the green body to form the ceramic to transparency.

A product, in accordance with one embodiment, includes an ink for forming a transparent ceramic. The ink is physically characterized as having a density, surface tension, and viscosity configured to enable material jetting of the ink in contained, sequential droplets having a volume in the range of about 1 picoliter to about 1 nanoliter when jetted from a nozzle having an inner diameter in the range of about 10 microns to about 300 microns.

A product, in accordance with one embodiment, includes a transparent ceramic, at least a portion of the transparent ceramic having layers of less than 50 microns per layer with physical characteristics of formation by material jetting.

A product, in accordance with one embodiment, includes an ink for forming a transparent ceramic. The ink consists essentially of a solvent and the constituents of a salt of a dopant of interest.

A method, in accordance with one embodiment, includes material jetting an ink onto a substrate to form at least one material jetted layer, the ink consisting essentially of a solvent and the constituents of a salt of a dopant of interest. The material jetted layer(s) is/are processed to transparency.

Other aspects and advantages of the present invention will become apparent from the following detailed description, which, when taken in conjunction with the drawings, illustrate by way of example the principles of the invention.

DETAILED DESCRIPTION

Figure 1:
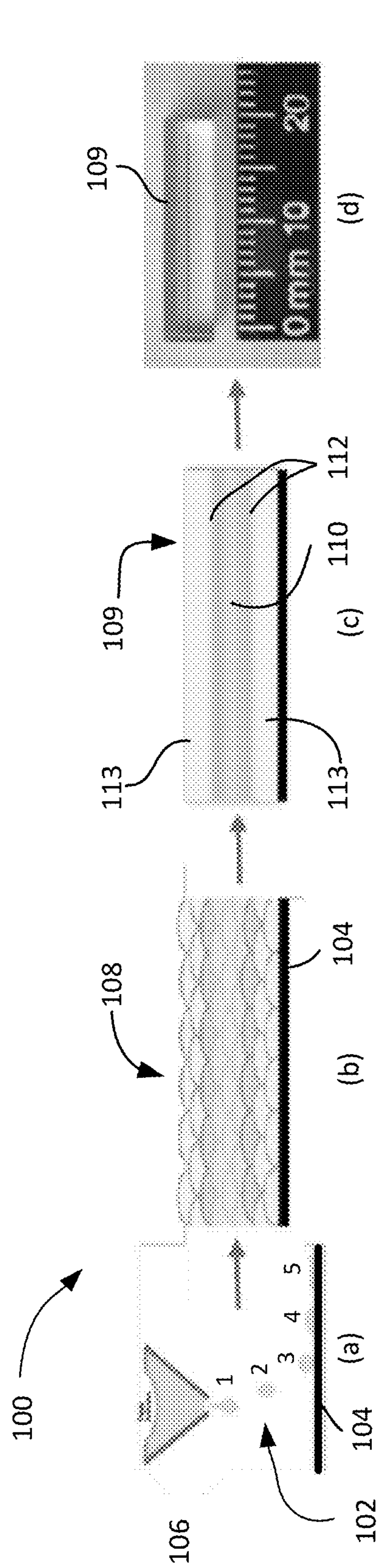
FIG. 1 is a representation 100 of a process for forming a planar waveguide via material jetting, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The present disclosure includes several descriptions of exemplary "inks" used in an additive manufacturing process to form the inventive optics described herein. It should be understood that "inks" (and singular forms thereof) may be used interchangeably and refer to a composition of matter comprising a plurality of particles coated with and/or dispersed throughout a liquid phase solution containing metal salts or organometallics, or a combination thereof, such that the composition of matter may be material jet printed to form a contiguous layer of ink by controlled material jetting of discrete droplets in a predefined pattern. In some approaches, the layer thus formed substantially retains its as-deposited geometry and shape without excessive sagging, slumping, or other deformation, even when deposited onto other layers of ink, and/or when other layers of ink are deposited onto the layer. As such, skilled artisans will understand the presently described inks, according to some embodiments, exhibit appropriate rheological properties to allow the formation of monolithic structures via deposition of multiple layers of the ink (or in some cases multiple inks with different compositions) in sequence.

The term "dopant" as used in the instant descriptions shall be understood to encompass any element or compound that is included in a host medium material, so as to convey a particular functional characteristic or property on the resulting structure. In most cases, the dopant will be incorporated into a crystal structure of the host medium material, e.g., during ceramic processing or during the synthesis of the starting material, customarily with nanoparticles. Skilled artisans will appreciate upon reading the present disclosure that dopants may include one or more dopant lasing species, e.g., included to convey lasing capabilities on a resulting structure. Dopants may additionally or alternatively include other species, e.g., included to tune optical properties such as refractive index of various spatial regions of the resulting structure.

Transparent materials are described herein. Transparency of a material is generally defined as having a luminous transmittance value of at least 85% of light passing through the material, and a haze of less than 4% in a 2.5 mm thick sample. Haze is defined as the cloudy appearance of the specimen and may be caused by surface imperfections, density changes, etc. Most preferably the transmission loss is <1%/cm. Ideally, a transparent material is transparent enough to allow light to pass through so that objects behind the formed optic may be distinctly seen. In some cases, a degree of transparency may also be defined as not opaque, optically clear, etc. These are by way of example only and are not meant to be limiting in any way.

The following description discloses several preferred embodiments of transparent ceramics and/or related systems and methods. Various aspects of the present disclosure use material jetting for high resolution ceramic printing.

According to some aspects, material jetting is used to form a ceramic green body that is subsequently processed into a transparent ceramic optic. Material jetting enables uniquely tunable spatial control of the composition as a function of position. In at least some approaches, a method includes using ceramic particles loaded into a liquid slurry having a predefined viscosity and surface tension to be jetted from a nozzle in discrete individual droplets of less than about 1 nanoliter per droplet by using a material jetting tool of known type. The droplets may be deposited onto a substrate in relatively thin films of desired patterns and layered to build up 3D structures, to be described in further detail below.

Material jetting of green bodies for transparent ceramics enables fabrication of planar waveguides with tailored doping profiles for controlling such things as the index, gain, and/or mode selectivity in laser gain media.

FIG. 1 is a representation 100 of a process for forming a planar waveguide via material jetting. As an option, the present process may be implemented to construct other structures such as those shown in the other FIGS. described herein. Of course, however, this process and others presented herein may be used to form structures for a wide variety of devices and/or purposes which may or may not be related to the illustrative embodiments listed herein. Further, the methods presented herein may be carried out in any desired environment. Moreover, more or less operations than those shown in FIG. 1 may be included in process, according to various embodiments. It should also be noted that any of the aforementioned features may be used in any of the embodiments described in accordance with the various processes.

As depicted in part (a) of FIG. 1, droplets 102 are applied to a substrate 104 via material jetting using a nozzle 106. At least some parameters to be considered for material jetting include the size of the droplet, the velocity of the spraying of the droplets, the effect of impact of the droplet, spreading characteristics (e.g., of the droplets, of the nozzle, of the material jetting machine, etc.), drying characteristics, etc. Referring to FIG. 1, parameters affecting droplet behavior are shown in sequence, particularly: 1. size of droplet, 2. velocity, 3. impact, 4. spreading, and 5. drying. These parameters may be controlled via various techniques that would become apparent to one skilled in the art upon reading the present disclosure, such as by selection of a particular nozzle diameter and/or shape, viscosity of the material being jetted, pressure applied to the material thereby affecting velocity, etc.

Figure 10:
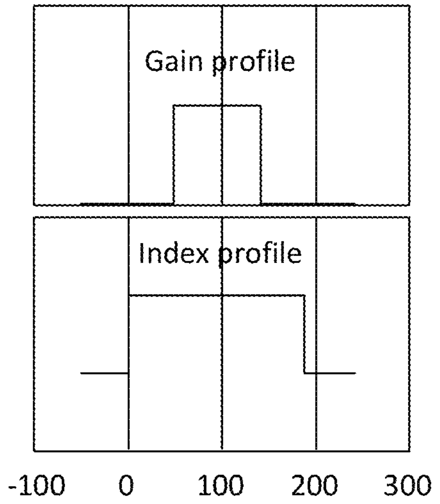
FIG. 10 includes charts of gain and index profiles for the structure of FIG. 9.

Referring to part (b) of FIG. 1, the droplets are formed layer by layer to form a greenbody 108, which is in turn processed into a waveguide 109 as shown in parts (c) and (d). By changing the composition of the material being deposited, layers having specific compositions can be precisely positioned within the greenbody, and ultimately the waveguide 109. In the example shown, the middle layer is a gain layer 110 of a first composition, while the two layers 112 on each side of the gain layer 110 are of different compositions having selected refractive indexes. Outer layers 113 may have a third composition. The unique compositions and their relative positions within the waveguide 109 provide the illustrative gain profile, illustrative refractive index profile, and illustrative gain selectivity similar to those depicted in FIGS. 10 and 11.

Material jetting is typically performed using a single nozzle. In some aspects, where the droplets are jetted one at a time (e.g., sequentially), the inherent resolution of the printed structure may be dependent on the droplet size and slurry properties, thereby enabling rapid and/or gradual compositional changes in the structure by changing the composition of the material being deposited.

Other approaches may use a plurality of nozzles. According to some approaches described herein, at least some of the nozzles may be loaded with different inks (e.g., inks having different compositions, inks having different particle components, etc.) for fabricating structures with complex composition and functionality.

Commercially available material jetting equipment employing piezo-actuated nozzles and/or acoustically driven nozzles may be used in various aspects of the present disclosure. In an exemplary aspect, a Nordson Pico Pulse Material Jetter (Nordson Corporation, Nordson EFD, 40 Catamore Blvd., East Providence, RI 02914 USA) may be used for material jetting approaches described herein. In other exemplary aspects, Dimatix Materials Printer DMP-2850 (Fujifilm Corporation, Fujifilm Dimatix Inc., 2250 Martin Avenue, Santa Clara, CA 95050, USA), the PicoSpotter (Polypico Technologies Ltd., Innovation House, Ballybrit Business Park, Galway, H91 X4AY, Ireland), the SonoPlot Microplotter (Sonoplot Inc., 3030 Laura Lane, Suite 120, Middleton, WI 53562 USA), etc., may be used. In other exemplary aspects, any other material jetting device known in the art may be adapted to perform at least some aspects of the present disclosure using custom inks (e.g., as described herein), as would be determinable by one having ordinary skill in the art. In preferred approaches, the machinery produces jetted droplets in the volumetric range of about 1 picoliter to tens of nanoliters per droplet.

Transparent ceramics are particularly useful for laser gain media. In some instances, beginning with nanoparticle feedstock, a series of consolidation and grain-growth procedures may be used to develop a contiguous polycrystalline optic with low optical scatter.

Figure 2:
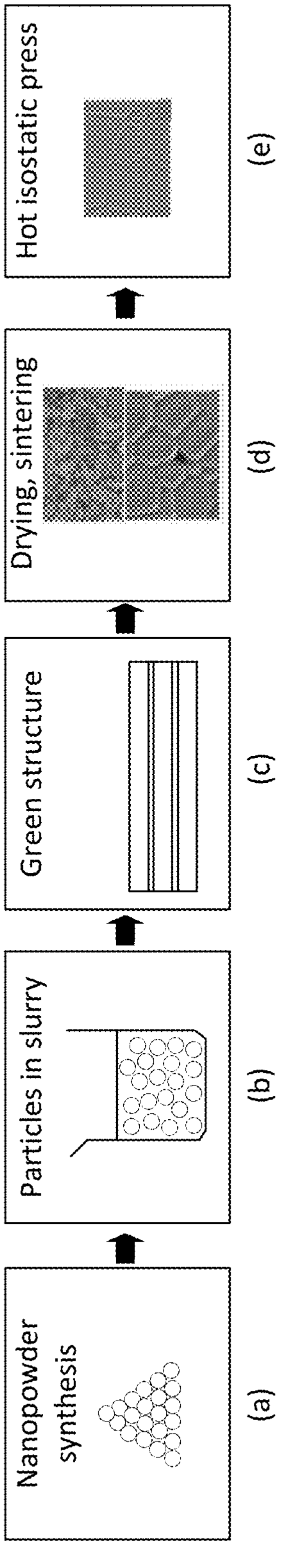
FIG. 2 is a graphical depiction of a method for consolidation of nanoparticles into a transparent ceramic optic, in accordance with one embodiment.

FIG. 2 depicts a method 200 for consolidation of nanoparticles into a transparent ceramic optic, in accordance with one embodiment. As an option, the present method 200 may be implemented to construct structures, devices, etc. such as those shown in the other FIGS. described herein. Of course, however, this method 200 and others presented herein may be used to form structures for a wide variety of devices and/or purposes which may or may not be related to the illustrative embodiments listed herein. Further, the methods presented herein may be carried out in any desired environment. Moreover, more or less operations than those shown in FIG. 2 may be included in method 200, according to various embodiments. It should also be noted that any of the aforementioned features may be used in any of the embodiments described in accordance with the various methods.

Part (a) of the process includes acquisition (e.g., purchase) or synthesis of nanoparticles for forming the desired stoichiometry of the resulting optic. For example, the nanoparticles may be synthesized via conventional chemical and/or combustion techniques.

Referring to part (b) of FIG. 2, one or more liquids such as organic solvents, water, surfactants, etc., or mixtures thereof may be used to create an ink having a suspension of particles (e.g., a particle slurry) with tuned rheology and volatility suitable for material jetting. Note that where the target structure is to have regions with different compositions, different inks may be formed to create each region and/or a gradient in composition. Alternatively, the composition of the slurry being jetted may be changed over time to allow formation of a gradient in composition in the structure.

Referring to part (c), the particle slurry may be formed into a green body by material jetting. The green body is preferably formed to have the desired spatial characteristics and shape, with the desired material compositions at the desired locations in the green body.

Referring to part (d), the as-formed green body may be dried until a partially dense solid body is created, optionally including heating and/or application of isostatic pressure. The liquid and organic components may be removed by firing at high temperatures, typically between 500° C. to 1200° C., as would be determinable by one having ordinary skill in the art. The body may be sintered at a higher temperature in a vacuum and/or controlled atmosphere to yield above about 95% density of the pure material (e.g., with uniaxial pressure, in some approaches, or by sintering in oxygen or vacuum).

Referring to part (e), conventional hot isostatic pressing (HIP) may be used to realize substantially 100% density of the material derived from the ceramic nanoparticle ink.

Figure 3:
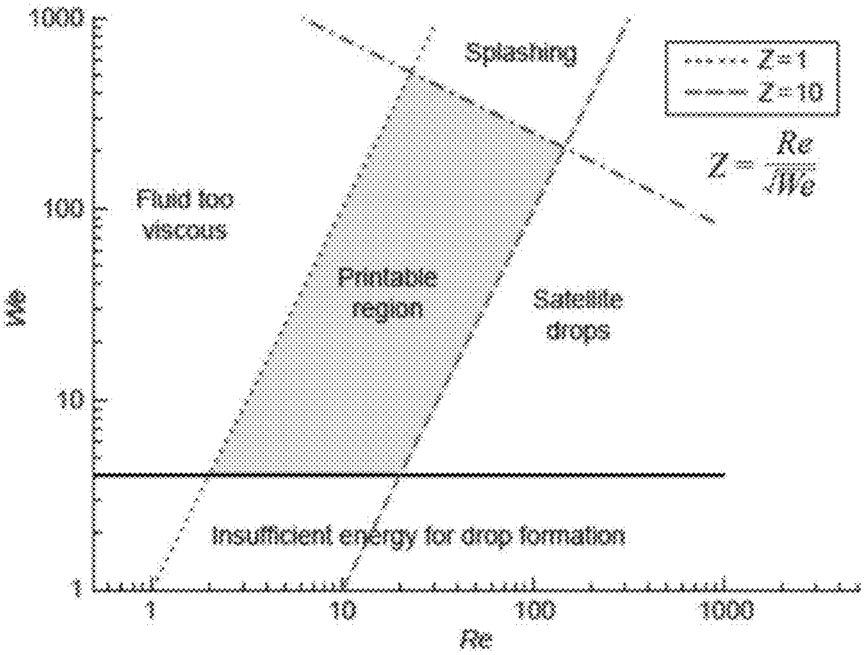
FIG. 3 is a chart depicting properties for successful ink-jetting described by the Reynolds (Re) and Weber (We) numbers.

Inks usable in various approaches, and/or the final products produced, e.g., by some of the processes described herein, may have at least some similar components, configurations, etc. as the inks and products disclosed in U.S. Pat. No. 10,840,668 (hereafter, "the '668 patent"), which is herein incorporated by reference. For example, various aspects of the present disclosure may use an ink having a similar composition as one disclosed in the '668 patent, but modified such that the slurry formed has a predetermined viscosity and surface tension whereby the ink is configured to be jetted through a nozzle in discrete droplets for fabricating structures. For example, the predetermined viscosity and surface tension may be selected determined via experimentation, modeling, etc. to provide the desired droplet characteristics in view of the parameters of the printing configuration. In one approach, the viscosity and surface tension may be selected according to a procedure like that described below with reference to the "Printable Region" of FIG. 3.

The results of the printing step(s) described herein are dependent in part on properties of the slurry such that the slurry may serve as an "ink" that is able to be jetted in contained, single droplets. Preferably, each droplet holds together until the droplet reaches the substrate, the droplets do not significantly splash upon impact, and the droplets sufficiently bond and/or mix with one another to create a homogeneous printed body. One skilled in the art, after being apprised of the teachings herein, would be able to create inks, based on compositions derived from the '668 patent, but suitable for material jetting. It should be noted that structures formable by the processes described herein can be much smaller in any dimension than those disclosed in the '668 patent, due to the unique material jetting processes described herein.

In one exemplary aspect, a product includes an ink being physically characterized by as having an optimized viscosity and/or surface tension for deposition through a nozzle configured for material jetting, where the inner nozzle diameter is in the range of about 10 microns and about 300 microns. Advantageously, various inks presented herein are able to be ejected through smaller nozzles than conventional inks, thereby improving the print resolution of transparent ceramics. In preferred aspects, at least some of the inks described herein may be material jetted in contained, sequential droplets having a volume in the range of about 1 picoliter to about 1 nanoliter when jetted from a nozzle having an inner diameter in the range of about 10 microns to about 300 microns.

Two unitless parameters (e.g., the Reynolds (Re) and Weber (We) Numbers) may be used as guides for developing inks. The definitions for Re and We are provided herein, respectively:

$$Re = \frac{\rho u L}{\mu}$$

$$We = \frac{\rho v^2 l}{\sigma}$$

where ρ represents the density of the fluid; ν represents the kinematic velocity of the fluid, u represents the flow speed; l represents the droplet size; L represents the nozzle size (e.g., the characteristic linear dimension); a represents the surface tension, and μ represents the dynamic viscosity.

An ink, according to various aspects of the present disclosure, is characterized by parameter Z, defined as:

$$Z = \frac{Re}{\sqrt{We}}$$

where Z for the inks described herein is ideally between 1 and 10, but Z could be higher or lower in some approaches.

According to at least some aspects of the present disclosure, parameter Z is optimized by modifying the constituents and/or concentrations of the ink, in a manner that would become apparent to one skilled in the art upon reading the present disclosure. Exemplary constituents and concentrations for a particle-loaded ink, and how they affect viscosity and surface tension, are presented in Table 1.

TABLE 1

| Ink Constituent | Concentration | Viscosity | Surface Tension |
|---|---|---|---|
| Solvent | 50-99 | Decreases | Increases/Decreases |
| Particles | 0-40 | Increases | Negligible |
| Metal Salts | 0-40 | Increases | Decreases |
| Dispersant | 0-10 | Decreases | Decreases |
| Binder | 0-20 | Increases | Decreases |

In various aspects, a product comprises an ink for forming a transparent ceramic. In preferred aspects, the ink is physically characterized as configured to enable material jetting of the ink in discrete droplets (e.g., jetting in single droplets without any significant "spraying" into satellite droplets, and ideally virtually no spraying at all). The ink preferably has a Reynolds number between about 1 and about 500. The ink preferably has a Weber number between about 1 and about 1000. In some approaches, the ink has a Weber number between about 50 and about 100. The Reynolds number and the Weber number selected to provide an ink having the properties needed for fabricating a particular product would be readily determinable by one having ordinary skill in the art once apprised of present disclosure and in view of the intended application. For example, thinner layers may be formed by increasing the Reynolds number by decreasing the solids loading of the ink.

An ink, according to various aspects of the present disclosure, may be a particle-loaded colloidal suspension configured to be suitable for material-jet printing. At least some aspects of the present disclosure include inks having optimized parameters such as the particle morphology, solids loading, the solvent, the dispersant, the binder, etc.

In some embodiments, the inks are colloidal. In preferred aspects, the ink is physically characterized as having rheological properties configured for jetting in contained single droplets. In preferred embodiments, the single droplets are "contained" such that they are held together until the droplets reach the substrate, or a previously-formed layer. Conventional powder substrates may be used in some approaches, such as $Y_3Al_5O$, $Y_2O_3$, MgO, $MgAl_2O_4$, and related compounds. In some approaches, a powder bed substrate comprises the same material as the particles in the ink, although the powder bed substrate may not be doped. The characteristics of the ink and the material jetting process are preferably such that the droplets do not splash upon impact. In preferred aspects, the droplets sufficiently bond to one another to create a homogeneous printed body.

In at least some aspects, an ink includes a particle-loaded colloidal suspension comprising a solvent and particles. Any solvent and/or particle composition that would become apparent to one skilled in the art upon reading the present disclosure may be used. In various aspects, a solvent may comprise water, an alcohol, a glycol, propylene, a cyclic carbonate, an oxygen-based glyme, etc., or any combination thereof. Illustrative particles in the ink may comprise oxides; halides; chalcogenides; garnets such as $Y_3Al_5O_{12}$, $Lu_3Al_5O_{12}$, etc.; bixbyites such as $Y_2O_3$, $Lu_2O_3$, etc.; fluorites such as $CaF_2$, $SrF_2$, etc.; spinels such as $MgAl_2O_4$; chalcogenides such as ZnSe; any other essentially cubic crystal structures able to be formed as transparent ceramics; or any combination thereof. In one preferred embodiment, the particles comprise Yttrium Aluminum Garnet (YAG). In preferred aspects, the oxides, chalcogenides, or halides are in cubic structure.

In some embodiments, at least one of the substrate materials is closely related to the material used in the particles of the ink. The material(s) used to form the substrate may be doped or undoped. For example, particles of the substrate may be doped or undoped. In some approaches, the substrate material(s) are pressed into a powder bed.

Referring again to Table 1 above, any dispersant that would become apparent to one skilled in the art upon reading the present disclosure may be used. Illustrative dispersants include ammonium polymethyl methacrylate, 2-[2-(2-Methoxy-ethoxy)ethoxy]acetic acid (MEEAA), Darvan®, etc., or a combination of dispersants.

With continued reference to Table 1 above, any metal salt that would become apparent to one skilled in the art upon reading the present disclosure may be used. Illustrative metal salts comprise Nd, Lu, Cr, etc., or any combination thereof. The solvent can be water or another solvent which dissolves the metal salt. In other aspects, the ink comprises at least one additional component including a polymeric species, another solvent, an oligomeric species, etc., or any combination thereof.

In at least some aspects, the ink comprises a first host medium and a second host medium. The first host medium may comprise at least one lasing species and/or at least one dopant. The second host medium may comprise either a different dopant (e.g., a different dopant than the dopant of the first host medium) or no dopant. Any suitable lasing species, dopant, etc. that would become apparent to one skilled in the art upon reading the present disclosure may be used. A lasing species may include trivalent rare earth ions or transition metals, etc. For example, the lasing species may include Pr, Nd, Sm, Eu, Tb, Dy, Ho, Er, Tm, Yb, Ti, Co, V, Cr, Fe, Ni, or any combination thereof. A dopant may include saturable absorber ions (e.g., $Cr^{4+}$, $Co^{2+}$, etc.), amplified spontaneous emission (ASE) absorber ions (e.g., $Cu^{2+}$, $Sm^{3+}$, etc.), ions to control the refractive index (cladding ions), etc., or any combination thereof.

In other aspects, solutions of metal salts are material jetted, according to at least some approaches described herein, in order to deposit dopants on the surface of ceramic particles that are, in turn, processed into doped transparent ceramics. Inks employing metal salts may include nitrates, carbonates, acetates, any other clean-burning counter anions to the metal that are soluble in the ink mixture, as would be determinable by one having ordinary skill in the art, etc., or any combination thereof.

Many metal ion dopants have been demonstrated to lase in crystalline media, the most important of which are rare earth and the transition metals. For example, $Nd^{3+}$ and $Yb^{3+}$ operate at laser lines near 1 micron, often efficiently and at the highest power levels; $Er^{3+}$, $Tm^{3+}$ and $Ho^{3+}$ operate in the range of about 1.5 to about 2.2 microns; $V^{2+}$, $Cr^{2+}$, $Cr^{3+}$, $Cr^{4+}$, $Ti^{3+}$, $Fe^{2+}$, $Co^{2+}$, and $Ni^{2+}$ offer broadly tunable radiation from the near IR to the mid IR.

The functionality of the laser ion is strongly influenced by the host crystal into which the ion is incorporated. Nearly all entail fluoride and oxide hosts, although in some instances chloride, bromide and chalcogenide hosts are used. (For example, the $Cr^{2+}$ and $Fe^{2+}$ ions have been found to only lase in the ZnSe host family.) Furthermore, many of the rare earth ions lase at a variety of wavelengths with varying levels of efficacy. For example, $Nd^{3+}$ also lases near 1.3 and 0.9 microns. Other rare earth ions such as $Pr^{3+}$ and $Ce^{3+}$ serve in niche applications, and others such as $Dy^{3+}$ and $Tb^{3+}$ are currently being explored but have been demonstrated to lase. There also are a variety of so-called upconversion lasers where two IR pump photons are absorbed, leading to lasing in visible or ultraviolet. The present invention is not intended to be limited by a particular ion-host laser combination, but instead it is to be understood that the method of using material-jetting is broadly applicable to a variety of laser ions, providing the intended host medium can be processed into a transparent ceramic with acceptable loss.

According to various aspects of the present disclosure, at least some of the inks described herein are material jetted to form a product comprising a transparent ceramic. In preferred aspects, at least a portion of the transparent ceramic has layers of less than 50 microns thickness per layer with physical characteristics of formation by material jetting. Physical characteristics of formation by material jetting may include the relatively thin and uniform layers of deposition of the droplets, the "stepping stone" sequential appearance of the resolution (e.g., smooth transitions between deposited droplets which decrease optical scatter through the transparent ceramic), a resolution in the range of about 5 microns to about 1 mm, etc. In at least some approaches, the portion of the transparent ceramic may be constructed of a plurality of such layers to form a large layer, e.g., a layer of gain medium, a layer of cladding, etc.

In some aspects, the transparent ceramic is an optical waveguide comprising an inner region having a higher refractive index than an outer region. For example, the optical waveguide may comprise a substantially rectangular channel (e.g., the inner portion) surrounded on at least two sides by the outer region. Other cross-sectional shapes of the inner region are also contemplated, such as circular, oval, polygonal, semicircular, etc.

In another exemplary aspect, the channel (inner portion) may be surrounded on all lateral sides by the outer region (e.g., edge clad), or substantially surrounded by the outer region.

In some aspects, the transparent ceramic is a gain medium. The transparent ceramic may be in the form of a waveguide, a laser rod, a laser slab, a ribbon waveguide, a channel waveguide, a thin disk, etc. For a laser active embodiment, the waveguide may be pumped to inversion by a diode laser.

In some aspects, the transparent ceramic may be in the form of a thin disk. See, e.g., FIG. 13 and accompanying description below. A thin disk may refer to a disk of material formed as described herein, having an axial thickness which is shorter than the diameter. A thin disk laser medium may comprise a region (e.g., a first host medium) doped with at least one laser ion (e.g., a lasing species as described herein), the doped region having a curved interface with respect to a second region (e.g., a second host medium), the second region not containing any laser ion dopant. In another approach, the second region may contain a second (e.g., different than the dopant of the first host medium) metal ion dopant that is transparent to the laser wavelength of the first region. In one exemplary aspect, the gain medium is juxtaposed with the second region doped with ions including saturable absorber ions, amplified spontaneous emission (ASE) absorber ions, ions to control the refractive index, etc.

In various aspects, the transparent ceramic comprises at least two optically distinct regions, each region being formed by material jetting using a different ink composition. A different ink composition may refer to a composition having at least one different component of the ink, a different ratio of components in the ink, an ink from a different nozzle of the material jetting device, etc., or any combination thereof. Optically distinct regions may refer to regions having different refractive indexes, different dopants in the host said regions having different functionalities, etc., in at least some approaches.

In various aspects, the optically distinct regions may be discrete layers in the product. For example, the optically distinct regions may include a gain layer (e.g., having the lasing species) and an inner cladding layer, e.g., as the three inner layers in the medium depicted in FIG. 1.

In other approaches, the optically distinct regions may be in the same layer of the product (e.g., the same deposition layer of the product). For example, the optically distinct regions may be inline in the same plane of deposition. In at least some approaches, a gradient may be formed between the two regions of the transparent ceramic such that there is a gradual shift in composition of the material in the transparent ceramic. In other approaches, the transitions are sharp.

In some preferred aspects, the transparent ceramic is a gain medium having a gain layer where the total deposition thickness of the gain layer is less than 100 microns. For example, the total deposition thickness of the gain layer can be less than 50 microns, less than 30 microns, less than 20 microns, or down to a single material jetted layer. The total deposition thickness of the gain layer may include all of the discretely material jetting-formed layers, as would become apparent to one having ordinary skill in the art upon reading the present disclosure. A deposition thickness of a gain layer which is less than 20 microns was not previously achievable by conventional techniques, including tape casting methods. Tape casting is a fabrication process whereby ceramic powder is loaded into a plastic binder and rolled into very thin sheets (e.g., typically approximately 100 microns thick or more). These sheets (or tapes) are stacked and laminated together in a press which forms the layered green structure of the ceramic. The layered green structure is densified according to conventional ceramic processing techniques. Conventional tape casting produces products having layers which are at least 100 microns thick. In stark contrast, layers producible according to various aspects described herein may have a thickness of less than 100 microns (e.g., 95 microns or less, 90 microns or less, etc.), and in some aspects in a range of about 15 microns to about 25 microns.

In at least some approaches, the transparent ceramic is a one-dimensional waveguide. The physical characteristics of the ink which enable fabrication of the waveguide via material jetting further enable the ability to produce extremely thin waveguides which were not previously achievable by known methods.

A method for forming a transparent ceramic of various types described herein may include forming a green body by material jetting any ink described herein. The method further includes processing the green body to form the ceramic to transparency. The processing may include sintering, hot-isostatic pressing, hot-pressing, cold isostatic pressing, calcining, etc., or any combination thereof as would be determinable by one having ordinary skill in the art upon reading the present disclosure and in view of the intended application.

Another aspect of the present invention is based on a simpler ink comprising a simple solution of solvent with dopant ions therein. While various additives may be present in the ink, e.g., such as any of the additives mentioned herein, in preferred approaches, the ink consists essentially of a solvent and the constituents of a salt of the dopant of interest.

In preferred approaches, the solvent may be water, thereby creating an aqueous solution; an organic solvent (e.g., such as an alcohol); etc. A benefit of using water is that the resulting ink has a viscosity only slightly higher than water, thereby enabling material jetting with nozzles of smaller diameter, which translates into smaller droplet size, thereby enabling even more granular control over the composition of the resulting layer.

The dopant of interest may be any dopant described herein and/or that would become apparent to one skilled in the art upon reading the present disclosure. Thus, where the dopant is metallic, a metal salt may be used. For example, an illustrative dopant is Nd. Thus, the salt $Nd(NO_3)_3$ may be dissolved in the solvent thereby forming the ink.

In an exemplary process using the aforementioned ink, the salt of the dopant of interest is dissolved in a solvent to create the ink. For example, continuing with the Nd example, the salt $Nd(NO_3)_3$ is dissolved in water, where it dissociates into the ions $Nd^{+3}$ and $NO_3^{-1}$.

The ink is material jetted onto a substrate, such as a previously-compressed bed of YAG powder. Because the bed of powder is porous, the jetted droplets wick into the upper portion of the bed of powder. One or several layers of ink may be applied to the substrate, depending on the level of doping and/or thickness desired, as would be determinable by one skilled in the art upon reading the present disclosure. Note that in some approaches, the ink may wick completely into the powder bed, such that the thickness of the powder bed does not significantly change.

An upper layer may be added to the printed structure, e.g., to add an upper cladding layer. Such upper layer may be formed by material jetting, application of more powder, or a combination of both.

The printed structure is then dried. Upon heating, $NO_2$ gasses off, leaving Nd in the upper portion of the powder bed as a dopant.

Additional steps, such as any others listed herein, may be performed to finish the structure and/or consolidate the layers into a final product such as a waveguide.

The foregoing process using the simple aqueous ink is particularly useful for creating small-dimension channel (e.g., one dimension) waveguides.

Experimental Results

Figure 4:
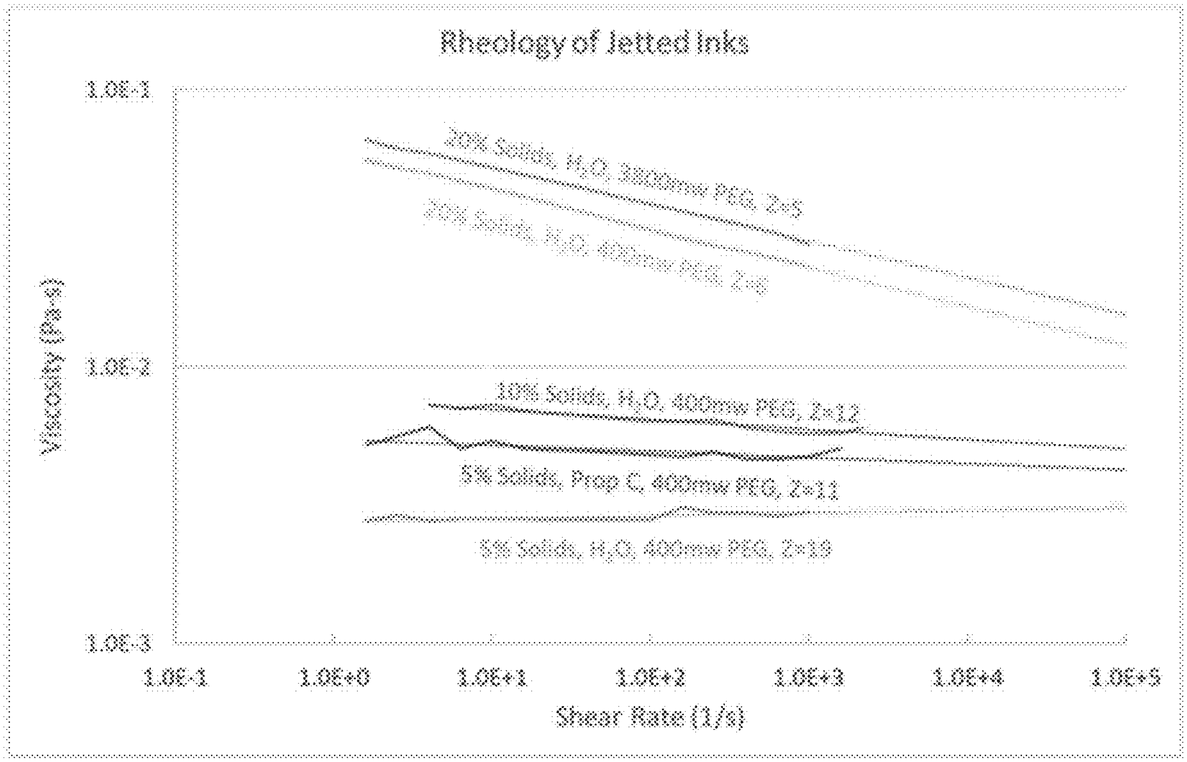
FIG. 4 is a chart depicting rheology curves for several different inks with varying solids, solvent, and binder molecular weight (mw).

FIG. 4 depicts rheology curves for several inks with differing solids loading levels (e.g., 5 vol. %, 10 vol. %, and 20 vol. %), solvents (e.g., water and propylene carbonate), and binder molecular weight (mw) (e.g., PEG or polyethylene glycol with a specified molecular weight). By extrapolating a dynamic viscosity at the assumed shear rate of the ink-jet velocity, and measuring the surface tension of these various inks, parameter Z was determined for each ink. The inks were tested for jetting through a piezo-actuated jet valve nozzle (e.g., Nordson EFD).

Figure 5:
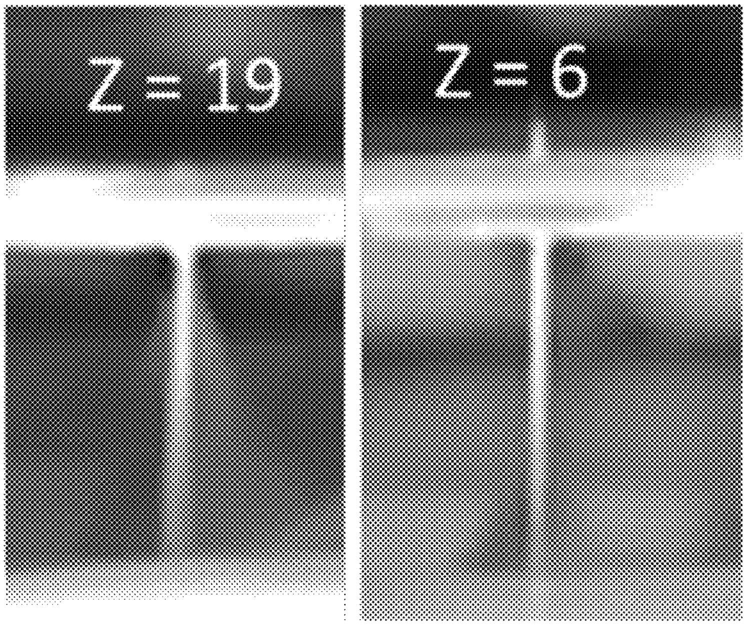
FIG. 5 includes two high speed images of jetted droplets with different "Z" values showing the effects of the satellite droplets.

FIG. 5 includes high speed images of jetted droplets with different "Z" values, showing the effects of satellite droplets. A "Z" value of 19 results in satellite droplets and side spray, while a "Z" value of 6 forms a uniform droplet jet stream, both consistent with FIG. 3.

Figure 6:
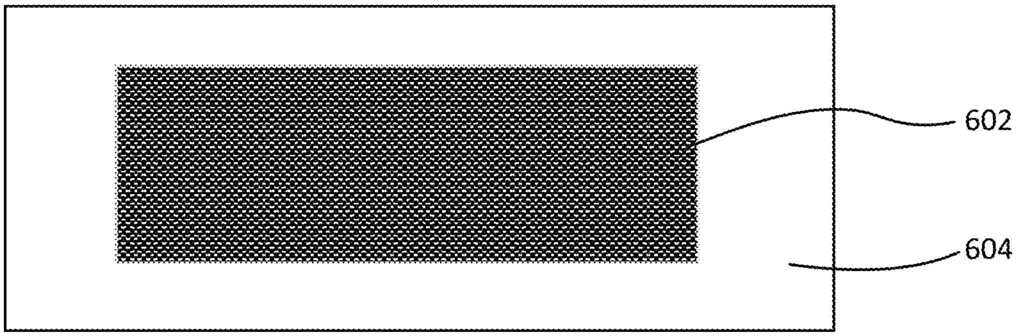
FIG. 6 is a depiction of a printed thin film of functionally doped particles (e.g., Yb: YAG) on a bed of undoped YAG powder, in accordance with one embodiment.

Once an ink was optimized to form consistent droplets without satellites or splashing, the nozzle was rastered over the substrate while optimizing droplet size and frequency, nozzle speed, line spacing, and number of layers in order to create a uniform thin film of printed drops. Reference is made to FIG. 6 of U.S. Provisional Patent Appl. No. 63/254,865 (hereafter "the '865 application"), which has been incorporated by reference. FIG. 6 of the '865 application includes images of the results of optimization of line spacing and number of layers to create printed thin films of different thicknesses.

In order to create a planar waveguide fully embedded within a transparent cladding, the ink jet nozzle was used to write a thin film 602 on a bed 604 of clad powder (e.g., undoped YAG) as shown in FIG. 6. See also FIG. 7 of the '865 application and related description. The ink included Yb, resulting in a thin film of functionally doped particles (e.g., Yb:YAG) on a bed of undoped YAG powder.

After the layer was deposited, additional clad powder was added on top of the entire structure, and the entire structure was pressed together to form a composite green body, ready for sintering.

Figure 7:
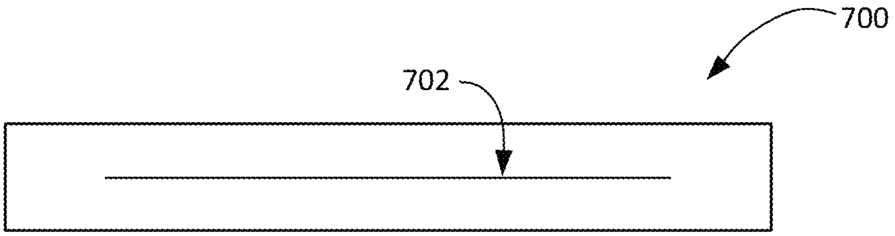
FIG. 7 depicts the finished optic formed from the printed film and bed of FIG. 6.
Figure 8:
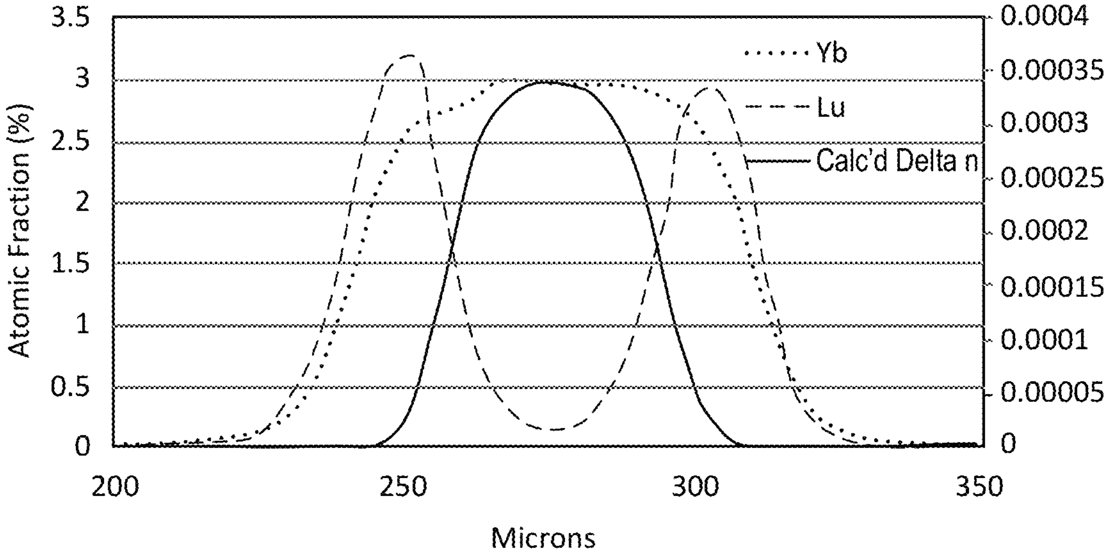
FIG. 8 is a chart depicting an e-probe line scan of dopant concentration in cross section, in accordance with one embodiment.

After the ceramic composite was sintered and hot isostatically pressed (HIP) to full density and high transparency, a planar waveguide 702 was created within the sintered and pressed structure 700, as shown in FIG. 7. In this optic, the waveguide is composed of YAG:3% Yb, while the cladding is composed of undoped YAG creating a Δn~0.0004 between the waveguide and the cladding. This appropriate value of Δn is what enables guidance of the light inside the waveguide. The resulting green color of the waveguide was due to some residual $Yb^{2+}$ that has not been annealed to $Yb^{3+}$ in order to allow those conducting the experiment to see the waveguide better visually. Waveguides with thicknesses between 25 to 300 microns have been successfully printed and formed into optics demonstrating resolution of printed layers. To test the waveguiding performance, a green laser was introduced into the optic. As shown in FIG. 8 of the '865 application, the light can be seen to propagate as a single mode where the light is guided by the printed layer. Upon exiting the optic, the light retains the single laser mode that was introduced at the front face, indicating that it has not scattered into other modes, and indicates that this waveguide is capable of single-mode laser performance.

Figure 9:
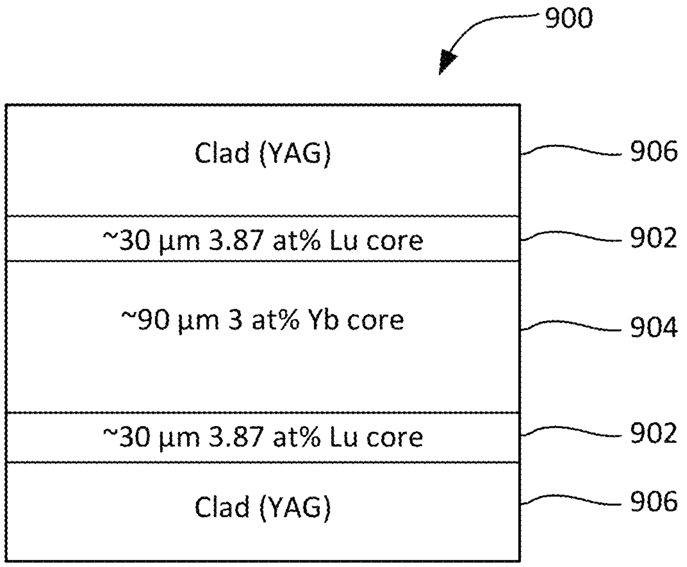
FIG. 9 is an illustration of a modeled 3-layer planar waveguide where the gain element is located only in the middle ~60% of the index profile.

The use of additive manufacturing to "write" the planar waveguide and the ability to use a plurality of inks in the writing of the desired optical body prior to numerous consolidation steps enables fabrication of complex structures with different regions of optical and/or thermal functionality. For example, a waveguide may be printed which is composed of multiple layers with different doping compositions. An example of this is shown in FIG. 9 of the '865 application, which shows a photograph of an ink jet printed 3-layer planar waveguide (top, middle). The central portion of the guide is actively doped with Yb, and (top, left and right) the outer top and bottom layers are passively doped with Lu to form an even refractive index across the guide (bottom). The Lu and Yb doping concentrations across the waveguide were validated via electron microprobe, which precisely measures the elemental composition as a function of position. The calculated refractive index profile, resulting from the doping profiles of Yb and Lu in YAG, is shown in the plot of FIG. 8.

Figure 11:
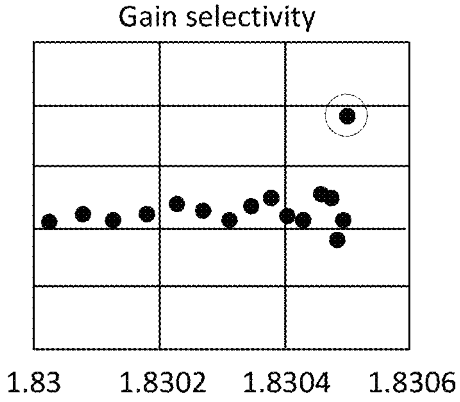
FIG. 11 is a chart showing the gain selectivity of the structure of FIG. 9.

In some exemplary aspects, a doping gradient may by implemented into the product. In one aspect, a doping gradient may be created by independently controlling the active ion and the index of refraction in a laser gain element. A 3-layer planar waveguide 900 with active ion $Yb^{3+}$ contained only in the central ~60% of the waveguide 900 is shown in FIG. 9. In the depicted structure, two outer core layers 902 comprised of Lu-doped YAG which surround the active region 904 act to expand the index profile without creating additional gain near the YAG cladding 906. Calculating the gain overlap with the various possible modes, the first order mode is selectively amplified over any other mode, creating mode stability in the amplifier, as exemplified FIGS. 10 and 11. Thus, the mode stability for this geometry and doping profile is capable of producing a particular mode that is more stable than the other modes, providing higher gain selectivity and stability. See the circled data point in FIG. 11, depicting a gain selectivity value achieved via modeling.

Such layered structures may be repeated to form a "ribbon" profile including multiple layers offering gain, in order to increase the overall power output from a given waveguide thickness.

In Use

Various aspects of the present disclosure are able to obtain well-behaved droplet deposition as exemplified in FIG. 5. See also FIG. 11 of the '865 application and related description.

Figure 12:
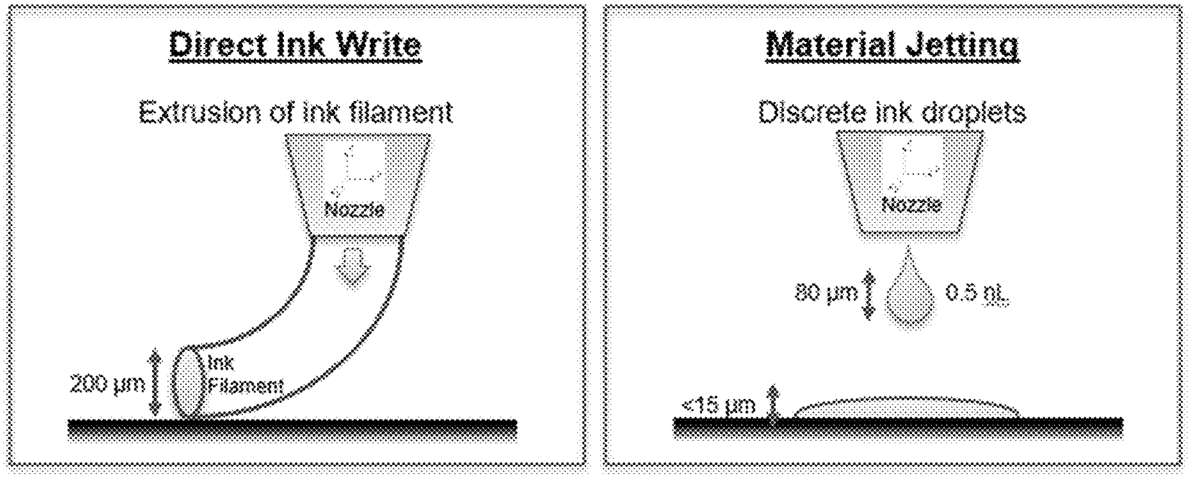
FIG. 12 is a depiction of a demonstration of relative deposition of material jetting according to various embodiments of the present invention vs. conventional direct ink write techniques.

The nature of the single stream of sequential droplets enables fabrication of relatively thin deposition layers compared to other additive manufacturing techniques, including direct ink writing (DIW), as exemplified in FIG. 12. Dimensions should not be deemed limiting unless otherwise noted herein.

Accordingly, at least some aspects of the present disclosure may be used to form extremely thin, uniform layers for use in various structures. Various aspects described herein may be used in gain media such as a planar waveguide, thin disks, rods, etc., with controlled 3D dopant and/or index profiles offering improved performance over conventional devices. Accordingly, many types of lasers may be created, including rod lasers, fiber lasers, planar waveguide lasers, slab lasers, thin-disk lasers and zig-zag lasers.

In one exemplary embodiment, a structure formed by material jetting a ceramic slurry as described herein may be used as a component of a planar waveguide used for laser gain media with 3D control of the index and gain profiles in the fast, slow, and longitudinal axes. An optic of this nature has enhanced mode stability and efficiency.

Figure 13:
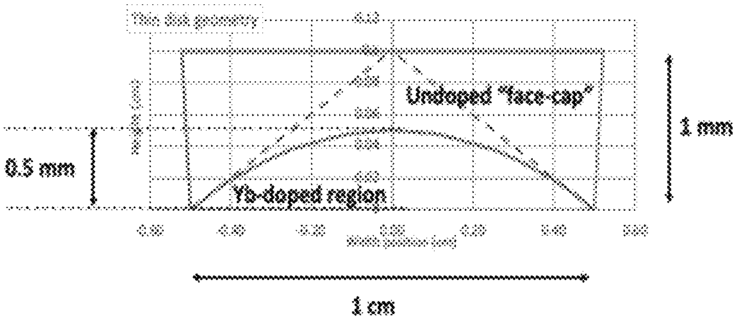
FIG. 13 is a graph showing the geometry of a thin disk gain medium with a curved interface between the active lasing region and the inactive clad layer.

In one exemplary application, tailored doping profiles in laser gain media created by material jet fabrication as described herein may be used in thin disk geometry. For example, a relatively thin disk (e.g., about 500 microns) of doped medium which is capped by a non-active cladding layer has superior thermal properties due to heat dissipation from the active region into the cladding. The interface between the active and clad regions is curved such that the active region is thicker in the center and thinner and near the edges of the disk as shown in FIG. 13. The gain profile is controlled by the thickness of the doped region, such that the extracted beam forms a Gaussian or other desired mode profile. An exemplary size for fabrication is shown in FIG. 13, but the values presented are presented by way of example only.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method for forming a transparent ceramic, the method comprising:

forming a green body by material jetting discrete droplets of an ink onto a substrate in a predefined pattern such that the droplets sufficiently bond and/or mix to form at least one contiguous layer of the ink; and processing the green body to form the ceramic to transparency.

2. The method of claim 1, wherein the ink is physically characterized as having a density, surface tension, and viscosity operable to enable material jetting of the ink in the discrete droplets.

3. The method of claim 1, wherein the processing includes processes selected from the group consisting of: sintering, hot-isostatic pressing, hot-pressing, cold isostatic pressing, and calcining.

4. The method of claim 1, comprising integrating the ceramic into a laser.

5. The method of claim 1, wherein forming the green body includes material jetting the ink onto a powder bed, wherein the jetted droplets wick into an upper portion of the bed of powder.

6. A method, the method comprising:

material jetting discrete droplets of an ink onto a substrate by spraying the droplets at a predefined velocity such that the droplets impact the substrate and spread in a direction parallel to a plane of the substrate, thereby forming at least one contiguous material jetted layer, the ink consisting essentially of a solvent and constituents of a salt of a dopant of interest; and processing the material jetted layer(s) to transparency.

7. The method of claim 6, wherein the at least one material jetted layer is in the form of a green body, wherein processing the material jetted layer(s) to transparency includes processing the green body to form a ceramic to transparency.

8. The method of claim 1, wherein the ink comprises a dispersant effective to reduce a viscosity and to reduce a surface tension of the ink, wherein the green body includes at least one material jetted layer, wherein processing the green body to form the ceramic to transparency includes processing the material jetted layer(s) to transparency.

9. The method of claim 1, wherein the ink has a Reynolds number between about 1 and about 500, wherein the ink has a Weber number between about 1 and about 1000.

10. The method of claim 1, wherein the ink is a particle-loaded colloidal suspension comprising a solvent and particles.

11. The method of claim 10, wherein the solvent is selected from the group consisting of: propylene carbonate, water, an alcohol, a glycol, a cyclic carbonate, and an oxygen-based glyme.

12. The method of claim 10, wherein the ink comprises an additional component selected from the group consisting of: a surfactant, a polymeric species, and an oligomeric species.

13. The method of claim 10, wherein the particles include cubic media, wherein the cubic media is selected from the group consisting of: an oxide, a halide, a garnet, a bixbyite, a fluorite, chalcogenide, and a spinel.

14. The method of claim 10, wherein the particles include at least one lasing species.

15. The method of claim 1, wherein the ink comprises a first host medium and a second host medium, the first host medium comprising at least one lasing species and/or at least one dopant, the second host medium comprising either a different dopant or no dopant.

16. The method of claim 1, wherein the processing the green body to form the ceramic to transparency renders an optical waveguide comprising an inner region having a different refractive index than an outer region.

17. The method of claim 1, wherein the processing the green body to form the ceramic to transparency renders a gain medium in a form selected from the group consisting of: a waveguide, a laser rod, a laser slab, a ribbon waveguide, a channel waveguide, and a thin disk.

18. The method of claim 1, wherein the processing the green body to form the ceramic to transparency renders a gain medium, wherein the gain medium comprises a host medium and a lasing species, wherein the lasing species is selected from the group consisting of: a trivalent rare earth ion and a transition metal.

19. The method of claim 1, comprising changing a composition of the ink being material jetted by a nozzle during formation of the green body for forming portions of the green body with different composition, wherein the processing the green body to form the ceramic to transparency renders a transparent ceramic having at least two optically distinct regions.

20. The method of claim 1, wherein a composition of the ink is changed during formation of the green body for forming portions of the green body with different composition, wherein the material jetting uses a same nozzle for formation of the portions.

* * * * *